United States Patent Office 3,438,506
Patented Apr. 15, 1969

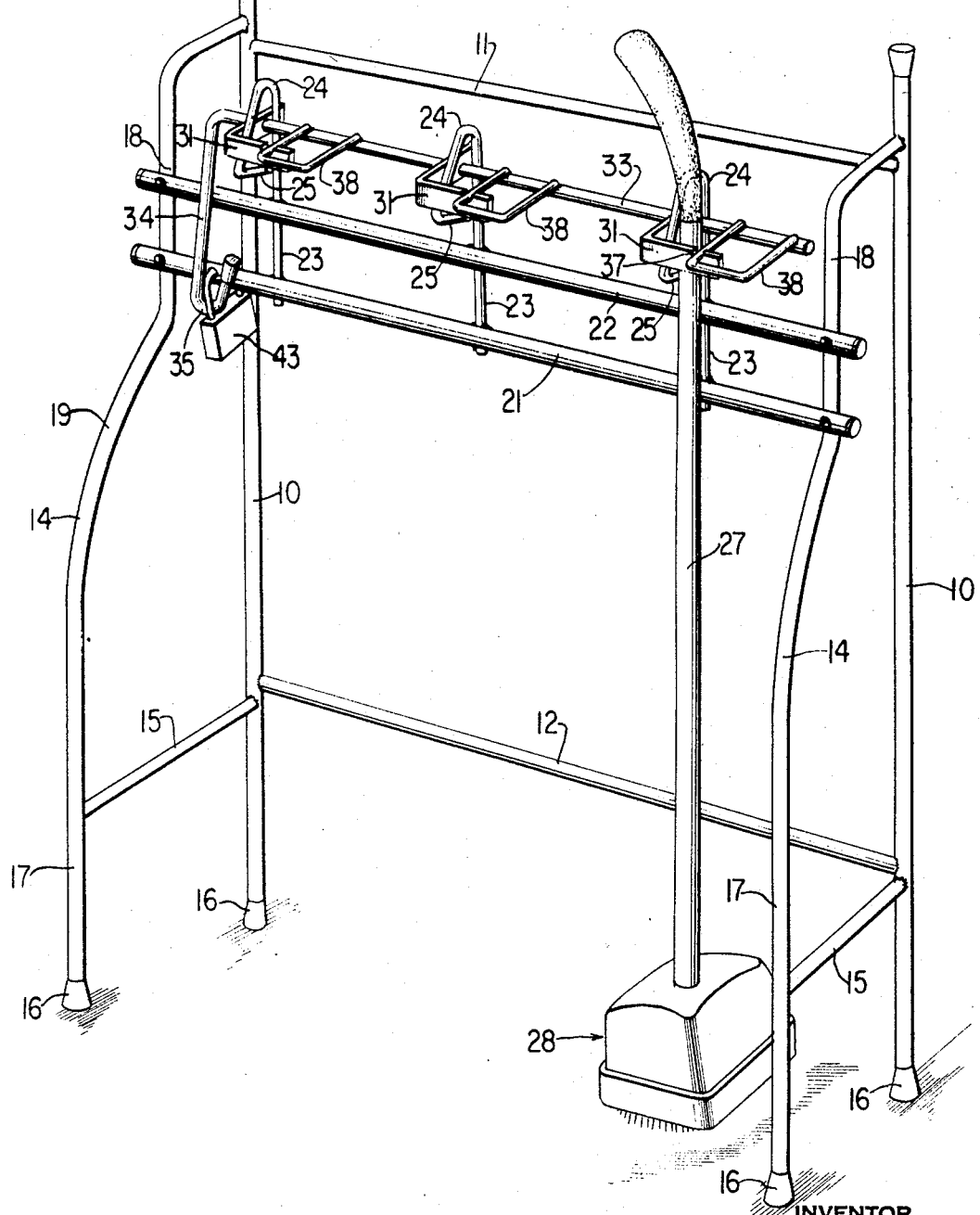

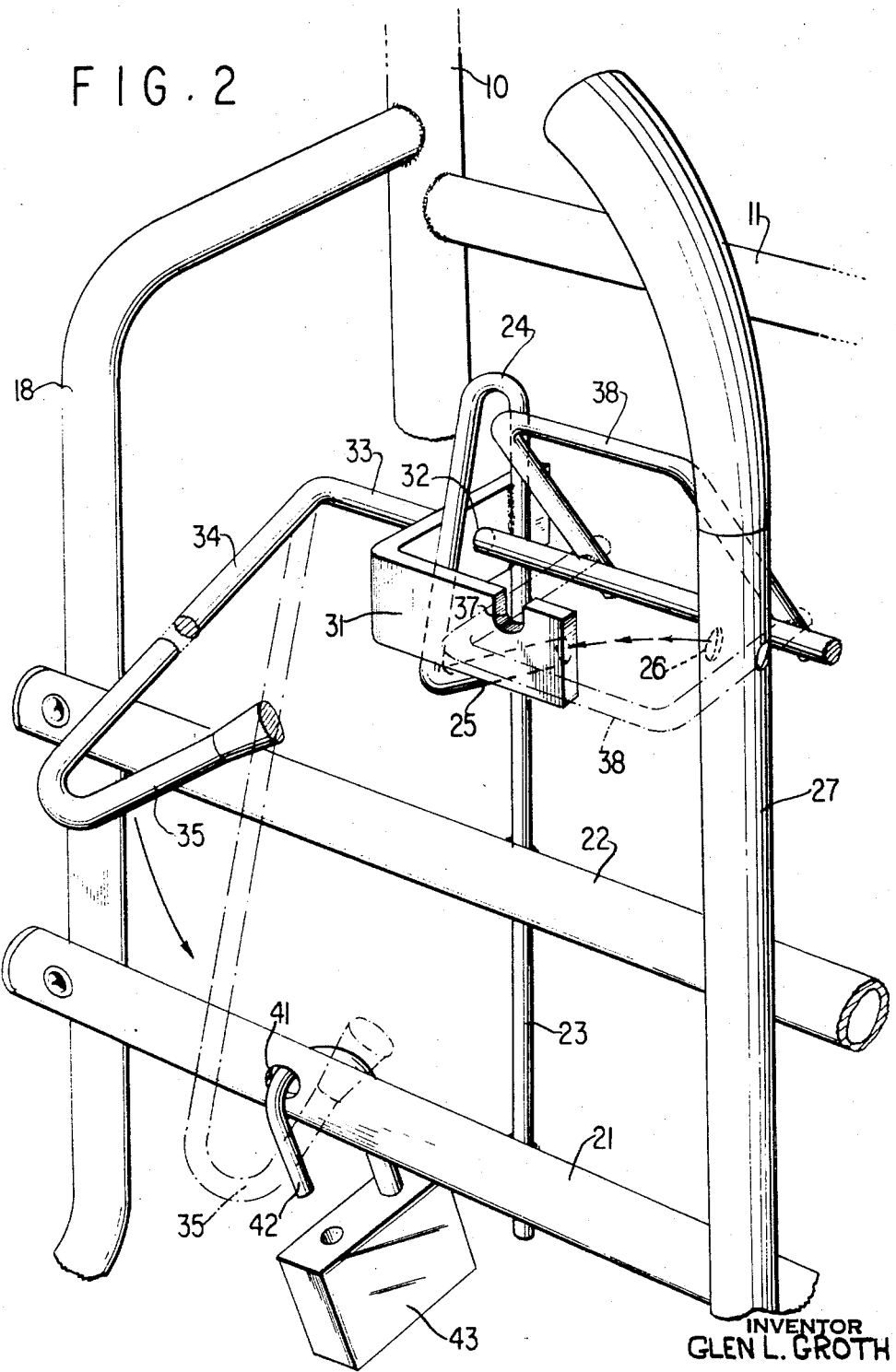

3,438,506
LOCKABLE DISPLAY RACK
Glen L. Groth, Tiburon, Calif., assignor to American Home Products Corporation, New York, N.Y., a corporation of Delaware
Filed June 13, 1967, Ser. No. 645,787
Int. Cl. *73/00;* A47f *7/024*
U.S. Cl. 211—4                          2 Claims

ABSTRACT OF THE DISCLOSURE

A lockable display rack for electric floor-care appliances is described, the rack having a locking subassembly comprising a frame portion to which are affixed support means terminating in generally horizontally extending hooks, brackets secured to said support means and partially enclosing said hooks, a locking rod rotatably mounted in mutually aligned holes in said brackets, and locking members secured to said locking rod and adapted to engage notches in said brackets so as to enclose said hooks, said locking rod being bent at one end into a crank handle, and means for locking said crank handle to said frame portion thereby preventing rotation of said locking rod and disengagement of said locking members from said notches, whereby said floor-care appliances may be displayed secure from risk of pilferage.

---

This invention relates to means for locking together a plurality of valuable articles, and more particularly to a display rack for supporting and displaying a plurality of units of household rental equipment and the like in which all of the units on display may be locked together efficiently to discourage unauthorized removal thereof.

It is a principal object of the invention to provide efficient means for locking together a group of valuable articles to prevent theft of any one of the articles from the group.

It is another object of the invention to provide such locking means which is particularly suitable for locking together a plurality of relatively heavy units of household rental equipment such as floor polishers, rug cleaners, etc., which rack includes such locking means for locking the units together and to the rack when the rack is left unattended.

It is another object of the invention to provide such a display rack in which the locking means is attached to the rack both in its locked condition and in its unlocked condition and in which the locking means does not detract from the appearance of the rack in either condition.

Other objects and advantages of the present invention will be apparent hereinafter, it being understood that the invention consists in the combination, construction, location, and relative arrangement of parts, as described more fully in the following specification, as shown in the accompanying drawings, and as finally pointed out in the appended claims.

In the accompanying drawings which illustrate a preferred embodiment of the invention:

FIGURE 1 is a perspective view of a display rack constructed in accordance with the principles of the invention, showing one household rental unit in place and with the rack's locking mechanism in locked condition.

FIGURE 2 is a perspective view on a larger scale of a fragment of the display rack of FIGURE 1 with the locking mechanism shown by solid lines in the open or unlocked condition and by broken lines in the closed condition. An appliance handle portion is shown ready to be hung on a hook of the rack and to be locked in.

Referring now in detail to the drawings, the display rack illustrated therein comprises a main frame having a pair of side members 10—10, preferably formed of rigid metal tubing, suitably interconnected and held in spaced parallel relation by an upper transversely extending tie rod 11 and a lower transversely extending tie rod 12, the said tie rods also being formed preferably of rigid metal tubing, and secured as shown to the side members 10 by bolts, rivets, or welding. A second pair of side members 14 shaped as shown is held in spaced relationship in their lower regions to side members 10 by interconnecting horizontal brace members 15, and are secured directly to side members 10 near the upper ends thereof, by any suitable means such as bolts, rivets, or welds.

The side members 10—10 and 14—14 thus constitute four floor-engaging supports and preferably are provided with wear-resistant replaceable feet 16. Side members 14 are seen to have vertical portions 17 and 18 joined by sloped portions 19. Horizontal brace members 15 may be formed of rod, tubing, or sheet metal, as desired; if of sheet metal, it is preferably stiffened by being embossed, bent, or rolled.

A pair of horizontal members 21 and 22 are secured in vertically spaced-apart relationship to portions 18 of shaped side members 14. A plurality of appliance-supporting members 23 are securely affixed to rear sides of horizontal members 21 and 22 in approximately uniformly horizontally spaced relationship. These appliance-supporting members rise vertically from lower lock assembly horizontal 21 beyond upper lock assembly horizontal 22 to a level intermediate the levels of horizontal 22 and upper transverse horizontal tie rod 11 where they bend forwardly and downwardly in a bend 24, and then generally laterally to form a hook 25 capable of easily engaging a socket hole 26 in an appliance handle 27.

A right-angled bracket 31 is welded to either the ascending or the descending portion of each supporting-member 23 (preferably to both) at a level intermediate the levels of bend 24 and hook 25. Bracket 31 is pierced by a hole 32 in the forwardly extending leg intermediate the areas at which it is welded to or abuts the ascending and descending portions of support-member 23; these holes 32 in brackets 31 are aligned with each other so that a locking rod 33 may be rotatably positioned therein. Locking rod 33 is bent at right angles near the plane of left (or right) side-members 10 and 14 to form an operating crank 34 capable of extending to a point slightly below the level of lower lock assembly horizontal 21. Conveniently crank 34 is bent back on itself near its end to result in an easily and comfortably grasped handle 35. Suitable detents are located on locking rod 33 to minimize lateral movement thereof; the exact location and form of these detents are not critical; they may be established simply by depositing a small amount of welding rod metal adjacent each side of one of the brackets 31.

Each bracket 31 is partially cut away on the upper edge of its laterally extending leg to provide a notch 37. Said notch is spaced from the forwardly extending leg of bracket 31 at least the diameter of an appliance handle and is spaced approximately as far from the plane of side-members 10 and 14 as is the end of the corresponding hook 32.

Corresponding to each bracket 31 and hook 32 is a member 38 rigidly affixed to locking rod 33, and extending radially therefrom. Member 38 is preferably in the form of a long square C mounted by its ends to rod 33, preferably by welding. These are mounted in such a way that when operating handle 35 lies against cross-bar 21, one leg of member 38 engages and is seated in notch 37 and abuts any handle 27 hung by socket hole 26 on the corresponding hook 25, effectively preventing removal of such handle from such hook.

By raising operating crank 34 into an approximately horizontal position, locking rod 33 is rotated and raises locking loops 38 up and away from brackets 31 and hooks 25, making removal of appliances 28 possible by merely grasping handle 27, and lifting to the right.

A hole 41 is drilled or punched all the way through lower lock assembly horizontal 21 at a point between the descending and ascending portions of crank handle 35 when the latter is in locking position, abutting horizontal 21.

Hole 41 is proportioned to receive the shackle 42 of a padlock 43. By passing shackle 42 around handle 35 and then locking the lock 43, handle 35 is held against horizontal 21 and the appliances 28 are held secure from pilferage on hooks 25. By unlocking padlock 43, handle 35 may be freed and raised into the unlocked position to release the appliances 28.

It will be understood that while the display rack illustrated in the drawings is a three-place unit adapted to the display of three similar or different appliances, racks incorporating the novel and valuable features of my invention may be constructed to display larger or smaller numbers of appliances. It is also to be understood that these appliances are ordinarily provided with electric cords, but since the said cords form no part of the instant invention, they have been omitted from the drawings.

What is claimed is:

1. A lockable display rack for a plurality of portable floor polishers, rug shampooers, or the like, in which each unit of equipment to be displayed has an opening portion and a manipulating handle extending upwardly therefrom, the said manipulating handle being provided with a side-socket near its upper end adapting the said unit to be hung on a generally horizontally disposed hook, said display rack including a main frame having laterally spaced side supports interconnected by a pair of upper transversely extending cross bars, said bars being in a common plane and spaced from each other, said cross bars being interconnected by a plurality of spaced apart appliance-supporting members each comprising a vertically ascending portion, an uppermost curved portion extending forwardly and downwardly and terminating in a laterally extending portion adapted to serve as a hook to support one of said equipment units, the said appliance-supporting members each bearing a bracket member extending forwardly and thence laterally from the upper region of its vertically ascending portion and extending forwardly beyond the descending portion of said appliance-supporting member, the forwardly extending leg of said bracket member being welded to said appliance-supporting member at at least one point of contact therewith, said bracket member extending laterally in the same general direction as said laterally extending terminal portion of said appliance-supporting member so as to constitute a bracket enclosing said laterally extending terminal portion on two sides, said bracket being notched on its upper edge near the end of its laterally extending arm and being perforated at a point intermediate between the points of contact with the ascending and descending portions of said appliance-supporting member, the perforations of all said brackets being in alignment, a rod rotatably mounted in said aligned perforations of said brackets, said rotatably mounted rod being bent through an angle of about 90° and adapted to serve as a crank whereby said rod may be rotated through at least about 90°, and horizontal members secured to and extending forwardly from said rod when said crank extends downwardly and extending upwards when said handle and rod have been rotated until the handle extends out horizontally, each of said members affixed to said rod being so positioned as to engage a respective one of the said notches of said brackets, so that when said handle of said rod is pointing downwardly, the handle of an appliance adapted to be hung on any of said appliance-supporting members would be protected from removal by abutment of said rod-mounted member against the handle of said appliance, thus impeding removal of said appliance, and padlock means for holding said operating crank against a fixed portion of the display rack when said rod-mounted members engage the notches of said brackets, thus securing said appliances against unauthorized removal.

2. In a lockable display rack for exhibiting floor-care appliances, an appliance-supporting subassembly comprising a pair of horizontal frame members adapted to be secured at their ends to vertical frame members, said horizontal frame members being held in spaced relation to each other by a plurality of appliance-supporting members terminating in laterally extending hook means, said appliance-supporting members each having a bracket rigidly affixed thereto, said brackets each having a laterally extending leg extending generally in the same direction as said hook means and notched in its upper edge opposite the end of said hook means, the other leg of each of said brackets being perforated, the perforations of all of said brackets being mutually aligned, a locking rod rotatably mounted in said aligned perforations, said locking rod being bent at a point beyond an outside bracket to form an operating crank handle, said locking rod having radially-extending locking members so affixed thereto and so spaced along its length as to be seatable in said notches when the said crank handle is in contact with one of said frame members and to be rotated to be clear of said brackets when the said crank handle is rotated a quarter turn.

References Cited

UNITED STATES PATENTS

| 2,935,202 | 5/1960 | Doerwald | 211—4 |
| 3,022,895 | 2/1962 | Kingsley | 211—4 |
| 3,326,385 | 6/1967 | Pinkerton | 211—4 |
| 3,289,895 | 12/1966 | Federman | 211—4 |

CHANCELLOR E. HARRIS, *Primary Examiner.*

U.S. Cl. X.R.

70—62; 211—60